United States Patent Office 3,443,595
Patented May 13, 1969

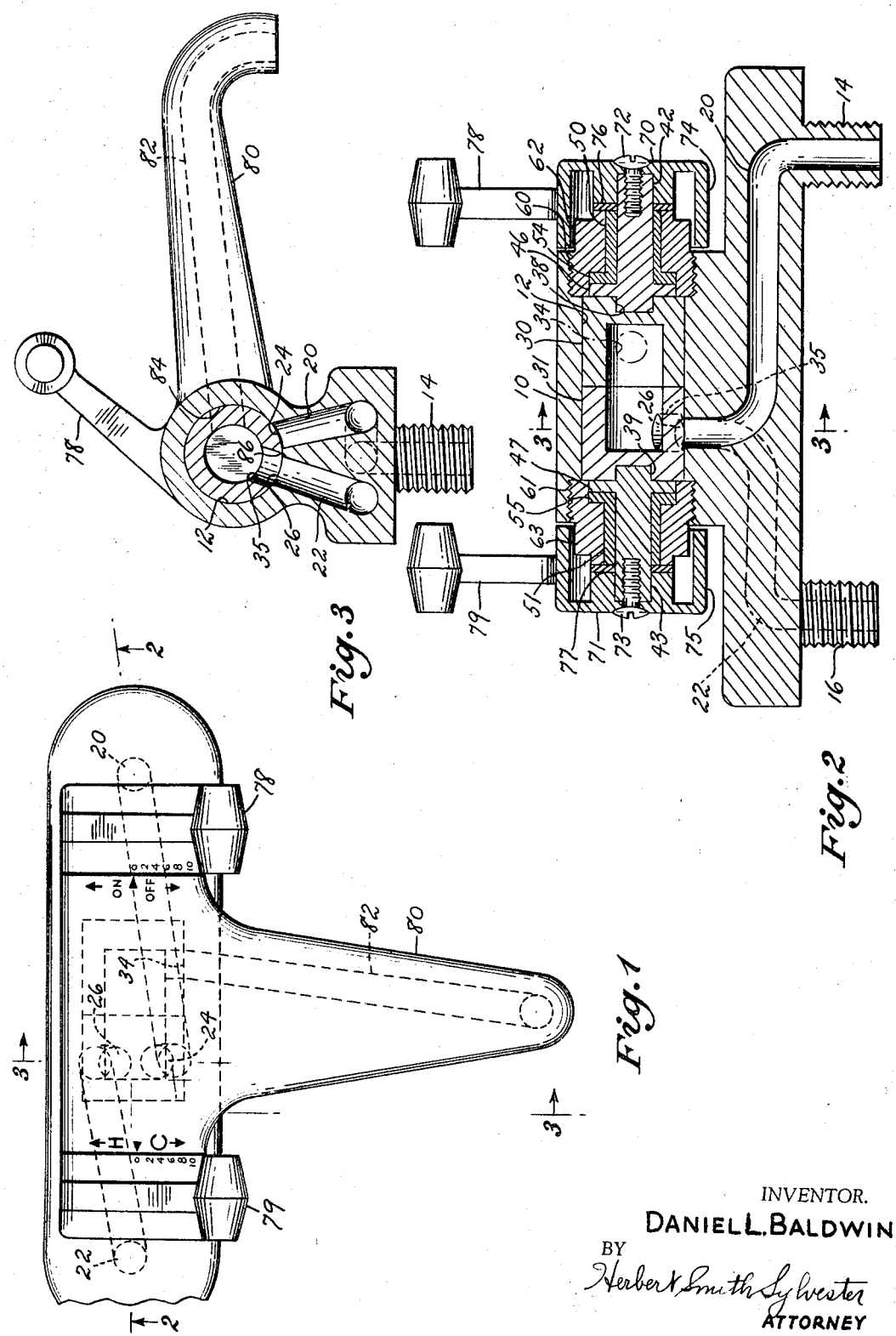

3,443,595
FAUCET VALVE WITH CO-AXIAL STEM SEPARATE CORRELATED ACTUATORS
Daniel L. Baldwin, 663 S. Pasadena Ave.,
Glendora, Calif. 91740
Filed Oct. 4, 1966, Ser. No. 584,203
Int. Cl. F16k 5/12; E03c 1/04
U.S. Cl. 137—637.3                    8 Claims

ABSTRACT OF THE DISCLOSURE

A faucet valve is disclosed which comprises a hollow body member having nested therein a pair of rotatable polymerized polyfluorinated hydrocarbon hollow cylindrical plugs, which plugs are closed at their remote ends, butted together at their open ends, and pierced by a radial bore in the side wall of each such that water can enter the common chamber formed within the opposed plugs through one bore and be discharged therefrom through the other bore through passageways in the body as the plugs are rotated to align the radial bores therein with said passageways.

---

This invention relates to faucet valves. More particularly, it relates to faucet valves of the plug type.

In accordance with the present invention, a faucet valve comprises a hollow body member having a cylindrical channel therein, a polymerized polyfluorinated hydrocarbon hollow cylindrical plug nested and adapted to rotate therein, said hollow cylindrical plug being closed at one end and open for fluid flow at the other end thereof, a fluid conduit disposed at the open end of said plug, a fluid passageway in said body member terminating in an opening in a side wall of said cylindrical channel, a radial bore for fluid flow through a side wall of said hollow cylindrical plug adapted to align with said opening on rotation of said cylindrical plug, water-tight means for compressing and retaining said plug within said body, and means for rotating said plug to vary alignment, and thereby flow of fluid, between said radial bore and said passageway.

The invention will be described further in connection with the accompanying drawings which are to be considered as exemplary of said invention and do not constitute limitations thereof.

In the drawings:

FIG. 1 is a plan view of a faucet valve in accordance with the present invention;

FIG. 2 is a view, in section, taken along the line 2—2 of FIG. 1 in direction shown; and FIG. 3 is a view along the line 3—3 of FIGS. 1 and 2.

In FIGS. 1–3, a valve body 10 is provided with a cylindrical channel 12 running lengthwise therethrough. Threaded nipple portions 14 and 16 for cold and hot water respectively form extensions of fluid passageways 20 and 22 leading through the valve body to circular openings 24 and 26 respectively into the cylindrical channel 12.

Symmetrically opposed at the midpoint of the cylindrical channel 12 are a pair of hollow cylindrical polytetrafluoroethylene (Teflon) plugs 30 and 31. These plugs are closed transversely at their remote ends and open to each other at their opposed, contacting ends.

The plugs are identical, each plug having a circular bore 34, 35 passing radially through the side wall thereof and a recessed splined concavity 38, 39 in the center of the outside of each closed end thereof.

The splined concavity 38, 39 at the end of each plug receives a mating splined shaft 42, 43 having a lateral collar 46, 47 which covers a major portion, and preferably at least about 75%, of the area of the closed end of each plug 30, 31. The collar 46, 47 extends laterally to a radius substantially greater than the radius of the hollow portion of the plug 30, 31, so as to apply pressure substantially uniformly over the outer end surface thereof.

The shafts 42, 43 are cylindrical in shape along the principal central portion of their length, and are journaled for rotation within bronze bushings 50, 51 having terminal flanges 54, 55 which ride on and support the lateral collars 46, 47 of the splined shafts 42, 43.

A threaded retainer 60, 61 having a hexagonally shaped shoulder 62, 63 urges each bronze bushing 50, 51 against the collar 46, 47 of each shaft 42, 43, and thereby urges each hollow cylindrical plug 30, 31 axially inwardly against the other. It may readily be seen that the force of compression between the two plugs 30, 31 may be determined by the extent to which the threaded retainers 60, 61 are tightened.

The shafts 42, 43 are also splined on their outwardly extending ends to receive a splined cap 70, 71 with a depending skirt 74, 75 which forms a terminal cover for the outer end of the upper portion of the valve body 10. A handle 78, 79 projects tangentially upwardly from each skirt. The splined caps 70, 71 are retained in place by machine screws 72, 73, and a washer 76, 77 is located between the inner face of the central part of each cap 70, 71 and the outer extremity of the bronze bushing 50, 51 and the retainer 60, 61. The washer 76, 77, may be made of Teflon or bronze. It prevents the handles 78, 79 from wobbling sideways and provides a bearing area for them.

A spigot 80 projects laterally forward from the valve body 10. The spigot envelopes a conduit 82 which extends from the delivery tip of the spigot to an opening 84 into the cylindrical channel 12. The opening 84 is disposed such that on appropriate rotation of the right-hand plug 30, the radial bore 34 therein will be aligned with the opening 84, thus facilitating control of the flow rate of water to the spigot 80. Similarly, the openings 24, 26 for cold and hot water respectively are disposed for alignment with the radial bore 35 in the left-hand plug 31, depending on the angular position thereof. The radial bore 35 is slightly greater in diameter than the openings 24 and 26 against which it is positioned for control of fluid flow, and preferably the radial bore 34 is the same diameter as the bore 35. Suitably the radial bore 34 and the opening 84 are of the same diameter, or the bore 34 may be slightly larger. Attention is also invited to the fact that the radius of the bore 35 at its outer end is approximately equal to one-half of the minimal center-to-center distance between the openings 24 and 26, which are, of necessity, separated by a discrete wall 86 therebetween at their closest point.

The cylindrical plugs 30 and 31 are fabricated from a polymerized polyfluorinated hydrocarbon such as, e.g., polytetrafluoroethylene (Teflon), the copolymer of tetrafluoroethylene and hexafluoropropylene (Teflon 100X), and polychlorotrifluoroethylene. These materials are characterized by suitably low coefficients of friction, resistance to erosion, appropriate elasticity and cold and hot flow properties, desirable chemical inertness and stability, and suitable dimensional stability and compressive strength such that they permit the instant construction which is long lived and trouble free and which avoids the need for periodic replacement of washers and/or packings which characterizes conventional faucet constructions.

The polymerized polyfluorinated hydrocarbon plugs 30, 31 are fabricated to be slightly larger in cross section than the cylindrical channel 12 in which they nest. The plugs are compressed prior to and during insertion into the channel, the aforementioned elastic nature and low coefficient of friction of the polymer facilitating the necessary compression for insertion and maintenance of liquid seal after insertion, while a the same time enabling free rotation of the plugs in the channel. Opposing pressure are applied to the plugs 30, 31 by the retainers 60, 61 respectively to aid in insuring a leak-free fit of the plugs with each other and with the channel 12. Suitably, the retainers 60, 61 may be tightened against each plug until rotation of one plug causes the other to rotate by virtue of the frictional engagement therebetween, at which point the axial pressure between the plugs is reduced sufficiently to permit free, independent rotation of each plug. In view of the extremely low coefficient of friction of the polymer from which the plugs are fabricated, very substantial pressure may be maintained between the plugs 30, 31 without experiencing undesirable frictional engagement between the two plugs.

As illustrated in FIG. 1, the top portions of the valve body 10 may bear suitable legends such as "On-Off" or "H–C" (for hot and cold) which, in conjunction with a scale peripherally disposed around the adjacent portion of the skirts 70, 71, permits pre-setting of the temperature of the water to be delivered, as well as a visual estimation of flow rate. One especially valuable advantage of this feature is that the temperature of the water to be delivered may be dialed on the scale affixed to the water-mixing control handle before any water is delivered, in order to prevent scalding or discomfort by the user.

Thus, in use, the left-hand plug 31 may be positioned (by rotation of the handle 79 and shaft 61 coupled thereto) to locate the radial bore 35 therein over the opening 26 to the passageway 22 for hot water, or over the opening 24 to the passageway 20 for cold water, or over both (to deliver any mixture of both hot and cold water), the position being indicated to the user on the H–C scale illustrated in FIG. 1. The water (mixture) selected travels through the radial bore 35 into the hollow core of the plug 31, from whence it enters the hollow core of the plug 30. If the plug 30 has been rotated (by use of the handle 78 and shaft 60 coupled thereto) to the angular position in which the radial bore 34 therein is in partial or complete alignment with the opening 84 to the spigot 80, the water (mixture) is discharged through the spigot at a rate determined by the completeness of such alignment, which conveniently is indicated by the On-Off scale shown in FIG. 1.

If desired, check valves may be installed in the water lines leading to the threaded nipples 14 and 16 to minimize possible flow of water between the hot and cold water systems affixed thereto. Also, an adjustable stop may be incorporated on the temperature control side to prevent delivery of undesirably hot water for protection of children and the like. Additionally, a Teflon sleeve could be inserted in the valve body with the plugs 30, 31 and the shafts 42, 43 combined to form one part each i.e., the plug 31 and the shaft 43 form one piece and the plug 30 and the shaft 42 form a second piece. The splines 39, 38, therefore, would not be necessary and would be omitted. (The sleeve would have the apertures in the appropriate locations.) All of these instant benefits would be retained and the faucet valve will function as stated.

What is claimed is:

1. A faucet valve comprising a hollow body member having a cylindrical channel therein, a pair of polymerized polyfluorinated hydrocarbon hollow cylindrical plugs nested therein, said plugs being disposed axially in juxtaposition to each other to form a common chamber therewithin, a pair of hot and cold water passageways in said body member terminating in openings in a side wall of said cylindrical channel adjacent to a first one of said plugs, a radial bore through a side wall of said first plug adapted to align with said openings on rotation of said first plug and permit thereby flow of water from at least one of said passageways through said radial bore into said chamber, a discharge passageway in said body member originating in an opening in a side wall of said cylindrical channel adjacent to the second plug, a radial bore through a side wall of said second plug adapted to align, on rotation of said second plug, with said opening originating said discharge passageway to permit flow of water from said chamber to said discharge passageway, water-tight means for compressing and retaining said plugs within said body, and means for rotating said first and second plugs to vary alignment, and thereby flow of water, between said hot and cold water passageways and said chamber and between said chamber and said discharge passageway respectively.

2. A faucet valve as set forth in claim 1 in which the radial bore is circular in cross section and of a radius approximately equal to one-half the minimal peripheral center-to-center spacing of said openings in which said hot and cold water passageways terminate.

3. A faucet valve as set forth in claim 1 in which said plugs each are closed at their remote ends.

4. A faucet valve as set forth in claim 3 in which the means for rotating said plugs includes means engaging the closed end of each plug.

5. A faucet valve as set forth in claim 1 which includes means for compressing said plugs against each other.

6. A faucet valve as set forth in claim 5 in which said plugs are of a normal, unconstrained diameter slightly greater than the diameter of the cylindrical channel within which they are nested.

7. A faucet valve as set forth in claim 1 in which said plugs are identical.

8. A faucet valve as set forth in claim 1 in which said plugs are polytetrafluoroethylene.

References Cited

UNITED STATES PATENTS

| | | | |
|---|---|---|---|
| 465,868 | 12/1891 | List | 137—637.05 |
| 1,070,896 | 8/1913 | Hughes | 137—637.3 |
| 1,354,522 | 10/1920 | Takala | 137—637.3 |
| 1,566,605 | 12/1925 | Jamison | 137—637.3 X |
| 1,960,843 | 5/1934 | Gilbert | 137—637.1 X |
| 2,601,053 | 6/1952 | Ovary | 137—637.4 |
| 2,744,542 | 5/1956 | Foster | 137—637.2 X |
| 2,832,562 | 4/1958 | Myers | 251—310 X |
| 3,193,245 | 7/1965 | Parker | 251—172 |
| 3,353,785 | 11/1967 | Eggers | 251—310 X |

CLARENCE R. GORDON, *Primary Examiner.*

U.S. Cl. X.R.

137—607